(12) United States Patent
Murarka et al.

(10) Patent No.: US 7,895,184 B2
(45) Date of Patent: Feb. 22, 2011

(54) AUTOMATIC FILTERING AND SCOPING OF SEARCH RESULTS

(75) Inventors: Neel I. Murarka, Cupertino, CA (US); Dane A. Glasgow, Los Gatos, CA (US); David Dawson, Seattle, WA (US); Elizabeth I. Yang, Redmond, WA (US); Hyder Ali, Cupertino, CA (US); Marek L. Gorecki, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 548 days.

(21) Appl. No.: 11/170,954

(22) Filed: Jun. 30, 2005

(65) Prior Publication Data

US 2007/0005573 A1    Jan. 4, 2007

(51) Int. Cl.
G06F 7/00 (2006.01)
G06F 17/30 (2006.01)
G06F 17/20 (2006.01)
G06F 3/048 (2006.01)

(52) U.S. Cl. .................. 707/708; 707/728; 707/755; 715/221; 715/808

(58) Field of Classification Search .............. 707/3, 707/728, 731, 708, 755; 715/221, 808
See application file for complete search history.

(56) References Cited

U.S. PATENT DOCUMENTS

| | | | | |
|---|---|---|---|---|
| 5,864,848 | A * | 1/1999 | Horvitz et al. | 707/6 |
| 6,564,222 | B1 * | 5/2003 | Sassano | 707/102 |
| 6,820,237 | B1 * | 11/2004 | Abu-Hakima et al. | 715/210 |
| 7,209,915 | B1 * | 4/2007 | Taboada et al. | 707/755 |
| 7,281,008 | B1 * | 10/2007 | Lawrence et al. | 707/7 |
| 7,370,276 | B2 | 5/2008 | Willis | |
| 7,437,358 | B2 | 10/2008 | Arrouye et al. | |
| 7,512,678 | B2 * | 3/2009 | Crabtree et al. | 709/224 |
| 2002/0046214 | A1 * | 4/2002 | Sandifer | 707/104.1 |
| 2003/0158855 | A1 | 8/2003 | Farnham et al. | |
| 2004/0061720 | A1 * | 4/2004 | Weber | 345/760 |
| 2004/0143569 | A1 * | 7/2004 | Gross et al. | 707/3 |
| 2004/0183829 | A1 * | 9/2004 | Kontny et al. | 345/751 |
| 2004/0267730 | A1 * | 12/2004 | Dumais et al. | 707/3 |
| 2005/0097089 | A1 | 5/2005 | Nielsen et al. | |
| 2005/0165777 | A1 * | 7/2005 | Hurst-Hiller et al. | 707/4 |
| 2005/0235034 | A1 | 10/2005 | Chen et al. | |

OTHER PUBLICATIONS

Cole, Bernard, "Search Engines Tackle the Desktop," Mar. 2005, IEEE Computer Society, pp. 14-17.*

Cusumano, Michael, "Google: What it is and What it is Not," Feb. 2005, Communications of the ACM, vol. 48, No. 2, pp. 15-17.*

Google TM Press Center, "Google Announces Desktop Search," http://www.google.com/press/pressrel/desktopsearch.html, printed on Jul. 30, 2005, 2 pages, USA.

* cited by examiner

Primary Examiner—John R. Cottingham
Assistant Examiner—James E Richardson
(74) Attorney, Agent, or Firm—Senniger Powers LLP

(57) ABSTRACT

A method and system for customizing a search of a data source linked to a computer in response to a search request from a user. A search tool application (STA) is executed on a client computer in response to the search request received from the user. The STA determines the context of a software application active when the STA is executed. The STA determines a scope of data to search based on the determined context. A user-interface is responsive to a search term received from a user to initiates a search the determined scope of data for content that matches the received search term. The results of the search are displayed in the UI.

15 Claims, 8 Drawing Sheets

AUTOMATIC FILTERING AND SCOPING OF SEARCH RESULTS

BACKGROUND

Currently available applications frequently include user interfaces (UIs) that include controls and/or text boxes to permit the user to define queries for searching the Internet, and/or their desktop computer memories, etc. However, such search UIs have been generally application specific insofar as their layout and functionality are concerned. That is, such a UI is generally used to search a particular scope of data related to application in which the UI is available. One primary reason for this limited functionality stems from the desire to impart standardization to various UIs.

SUMMARY

Embodiments of the present invention overcome deficiencies in existing search tools. For example, against the backdrop of standardized UIs, aspects of the invention provide a universal search tool that is user friendly, aesthetically pleasing and that has improved functionality. Moreover, such an improved search tool provides the user relevant search results as a function of the active application. By exposing search functionality in multiple applications and entry points via toolbars and add-ons, users are provided quick access to desktop and web searching capabilities. However, providing the most relevant search results is still a challenge. Embodiments of the inventions help improve the relevance of search results by using the application context to select default filters and scopes for searches. Determining a user's intended search scope and/or targeted search store without explicit user selection is not currently done from existing application add-ons toolbars.

Computer-readable media having computer-executable instructions for initiating searching embody further aspects of the invention. Alternatively, embodiments of the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
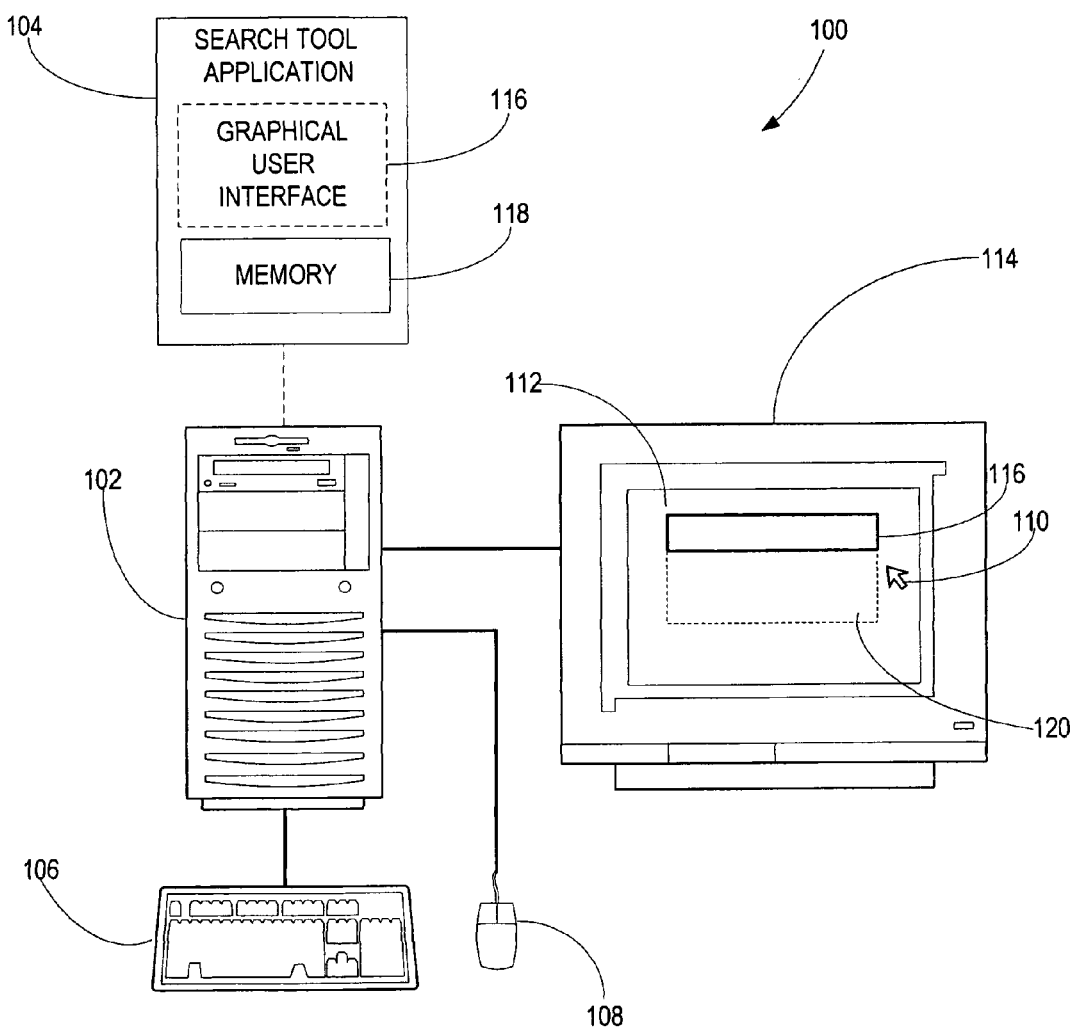
FIG. 1 is a block diagram of a computer system embodying aspects of an embodiment of the present invention.

Referring to the drawings, FIG. 1 illustrates an exemplary computer system 100 in which the present invention can be used. System 100 includes a client computer 102 that executes a search tool application (STA) 104 in response to user input. The STA 104 is preferably implemented as part of an operating system that provides an environment for launching and managing various software applications. The computer 102 receives input data from an input device such as a conventional keyboard 106 and executes the STA 104. Those skilled in the art are familiar with the use of cursor keys on the keyboard 106 as well as, a mouse 108, trackball, or other pointing device to move a cursor 110 on a computer display screen 112 of a monitor 114 of the client computer 102 for the selection of various options and/or executing applications. Although the present invention is described in conjunction with a conventional desktop computer, it will be appreciated that the present invention may be utilized in other types of computer systems that use a window-based display system.

When executed, the STA 104 generates a graphical user interface (UI) 116 to be displayed on the display 112. The UI 116 enables the user to define a query and initiate a search of relevant online and/or desktop data sources. More specifically, the STA 104 determines a search scope or target data source to search based on the context of a particular software application active when the STA 104 is executed and presents a UI 116 customized for searching the determined target data source. The STA 104 includes a memory 118 that stores UI data for displaying the customized UI 116. For example, and as explained in more detail below, the memory 118 stores a data table that determines which customized UI to display for a particular software application. The UI includes a search results window 120 for displaying the results of the search of the relevant data source. The search results displayed in the search results window 120 include, for example, one or more files (e.g., program files, document files) having content that matches the search term defined by the user.

An embodiment of the invention provides a search tool that presents a customized UI 116 based on an anticipated search scope as determined from a current application being used by the user. For example, if the active application is a web application, the STA 104 presents a UI 116 element customized for searching a (data source on the web. Alternatively, if the current application is an e-mail application, a UI customized for searching data source associated with an e-mail account. By determining a user's intended search scope without explicit user designation or selection, aspects of the invention improve search efficiency and the relevance of search results by providing a search tool that is "lighter," customizable, and more aesthetically pleasing to the user.

Figure 2:
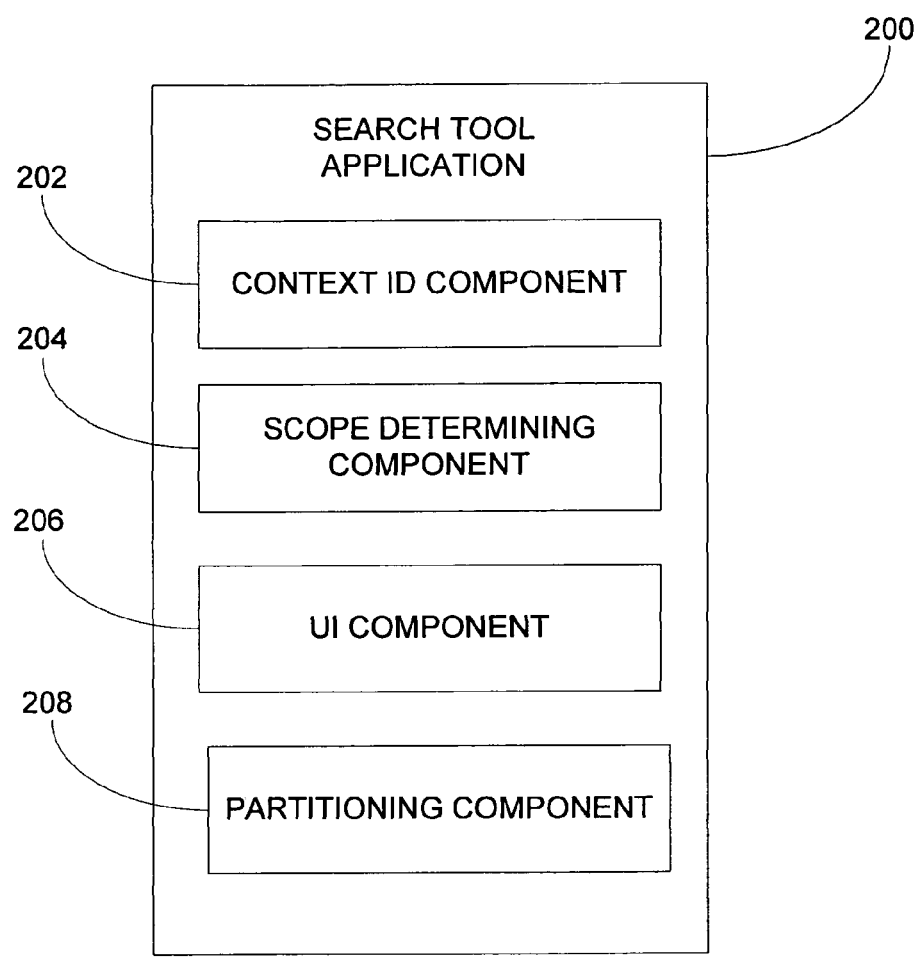
FIG. 2 is a block diagram illustrating components of a Search Tool Application according to one embodiment of the invention.

Referring now to FIG. 2, a block diagram illustrates components of an STA 200 (e.g., application 104) according to one embodiment of the invention. The STA 200 executes a context identifying (ID) component 202 that determines the context of the active application when the STA 200 is executed. In one embodiment, the context ID component 202 determines the context of the active application from data included in the application. For example, STA 200 searches metadata included in the active application's header to identify pre-defined context data. Alternatively, the context ID component 202 parses content being displayed on the computer display 112 (See FIG. 1) by the active software application to detect structured data (e.g., URLs, words, metatags). Thereafter, the STA 200 compares the detected structured data to context hints stored in a memory such as memory 118 in FIG. 1. As used herein, a context hint defines an anticipated context of the active application based on patterns included in detected structure data. For example, consider that the context ID component 202 searches content being displayed on the display 112 and detects a URL (e.g., http:/www.someaddress). In this case, the context ID component 202 compares the "http:/" included in the detected URL to the stored hint data and determines the anticipated context is a web site. In another embodiment, the active software application and the STA 200 engage in a cross communication process to determine the context of the active application.

The STA 200 is responsive to the determined application context to execute a scope determining component 204 to determine a scope of data (scope) to search as a function of the determined context. As used herein, the scope refers to a target source at which to search for content corresponding to a user defined query. In one embodiment, a default scope is pre-defined for each of the various application contexts and is stored in a memory (e.g., memory 118). The scope determining component 204 searches the memory to identify the scope that corresponds to determined context. For example, if the determined application context is a web browser application, such as Microsoft Internet Explorer® available from Microsoft Corporation, the determined scope corresponds to files and documents accessible via a communication network such as the Internet. Alternatively, if the user is executing an application stored locally on the computer, the determined application context is a desktop application and the determined scope corresponds to locally stored files and documents.

After the scope is determined, the STA 200 executes a UI component 206 to present a UI 116, via the display 112, configured to accept user input for filtering the determined scope to provide the user relevant search results. For example, if the user is using a web browser application (e.g., Microsoft Internet Explorer®), the UI component 206 presents a UI 116 configured for searching the Web. In one embodiment, the UI component 206 determines the appropriate UI 116 to present on the display 112 by searching a data table stored in memory. For example, Table 1 shows an exemplary data table in which a corresponding UI is defined for various scopes of data.

TABLE 1

| USER INTERFACE (UI) | SCOPE OF DATA |
| --- | --- |
| Communication Network UI | Communication Network |
| Local Desktop UI | Local Desk Top |
| E-mail UI | E-mail |

As an example, if the determined scope of data is a communication network, the UI component 206 displays the communication network UI which is configured for searching a communication network such as the World Wide Web.

Figure 3:
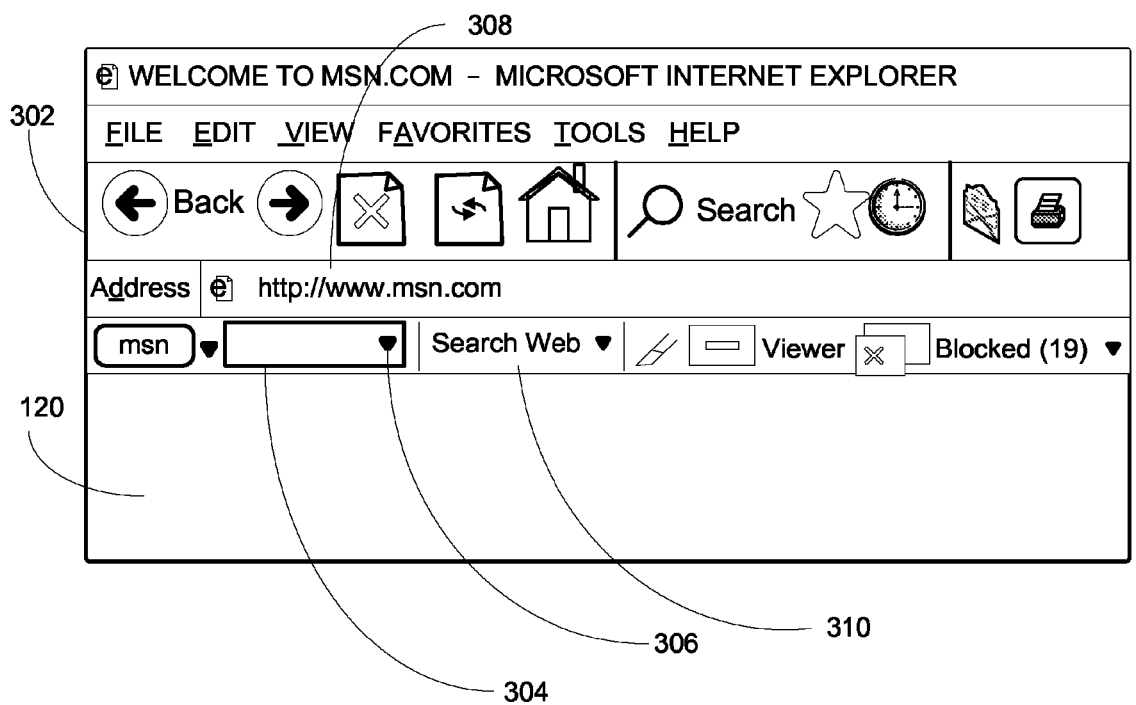
FIG. 3 is a screen shot of an exemplary UI for searching a communication network according to one embodiment of the invention.

Referring briefly to FIG. 3, an exemplary screen shot illustrates a communication network UI 302. The communication network UI 302 includes an input control 304 for defining one or more search terms that are of interest to the user. For example, using techniques known to those skilled in the art, the user uses the mouse 108 or keyboard 106 to select the input control 304 and then uses the keyboard 106 to enter text, or other characters to define a search term or terms. Alternatively, the user clicks a drop down arrow, as indicated by reference character 306, on the input control 304 and selects a search term from a list of recent search terms. The communication network UI 302 in the illustrated embodiment includes an address control 308 that includes default data identifying the default data source. In this example, the default data identifies an address or location (e.g., www.m-sn.com), and, thus, the default data source is the particular server located at the identified address on the Internet. Thus, the default data serves as a filter to limit the search for content matching the one or more defined search terms to the location (i.e. default data source) of the particular server corresponding to the default data. Using techniques known to those skilled in the art, the user uses the mouse 108 or keyboard 106 to select a search control 310 displayed on the UI 302 to initiate the search of the particular server located at the identified address, and to display search results corresponding to the defined search term the search results window 120. Notably, in one embodiment, the search results window 120 appears after the user begins entering a search term into the input control 304. For example, the search result window 120 and search results are displayed after the user enters the first character of a search term in the input control 304.

Figure 4:
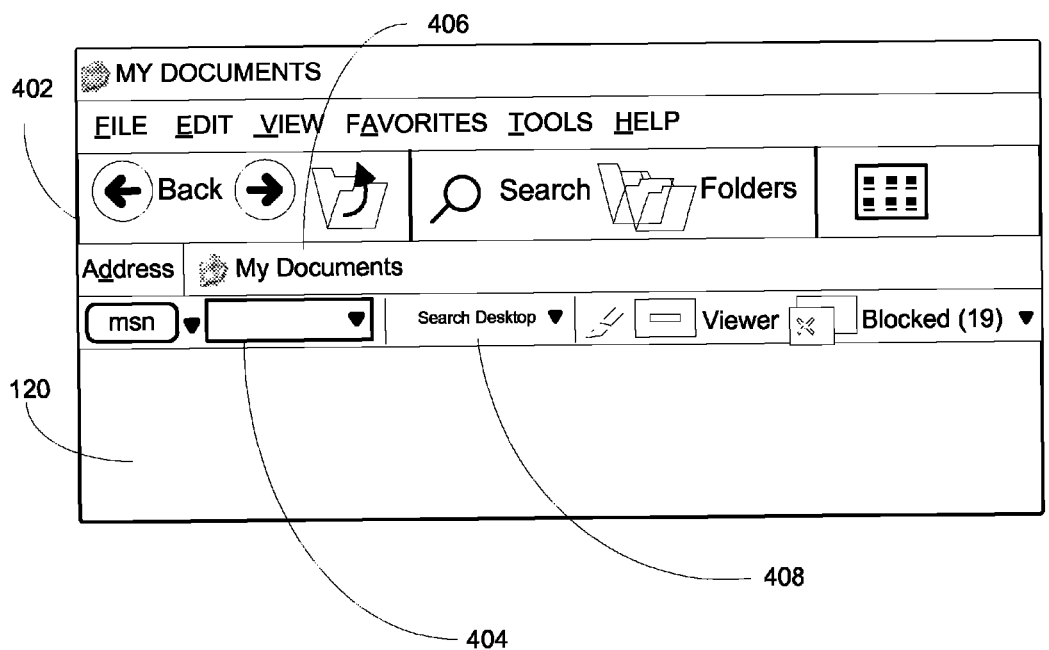
FIG. 4 is a screen shot of an exemplary UI for searching a local computer according to one embodiment of the invention.

Referring again to FIG. 2 and Table 1, if the determined scope of data is the local desktop, the UI component displays the local desktop UI which is configured for searching the local desktop. Referring now to FIG. 4, an exemplary screen shot illustrates a desktop UI 402. The desktop UI 402 includes an input control 404 for defining one or more search terms that are of interest to the user. The desktop UI 402 includes an address control 406 that identifies default data that serves as a filter to limit the user search results to provide the user more relevant results. In this case, the default data source identifies a particular folder (e.g., My Documents), and, thus, the default data source is the client computer on which the particular folder is located. Thereafter, the user uses the mouse 108 or keyboard 106 to select a search control 408 displayed on the UI 402 to initiate the search of the particular folder on the client computer and to display search results (e.g., document files) corresponding to the defined one or more search terms in the search results window 120.

Figure 5:
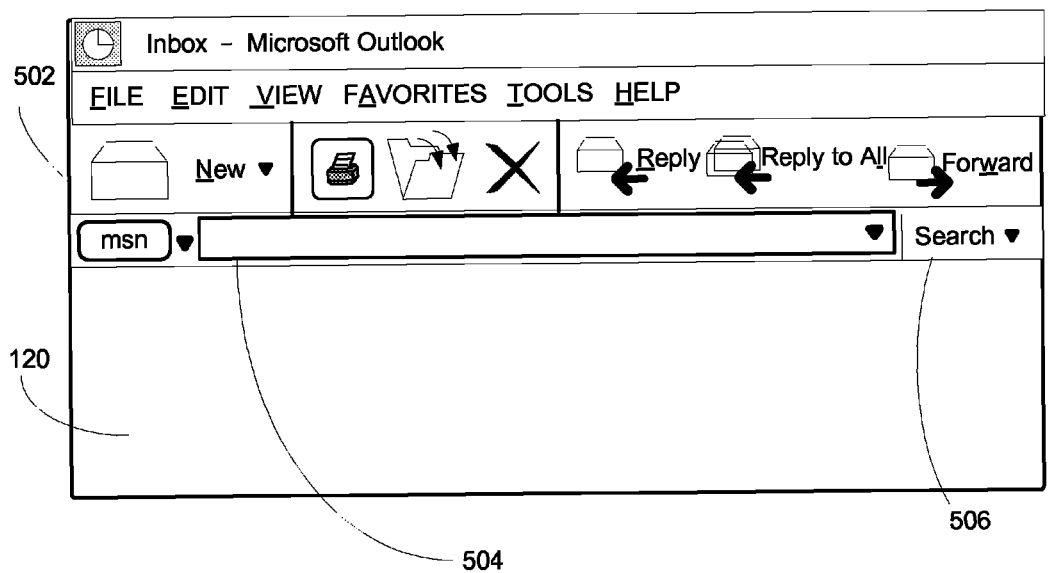
FIG. 5 is a screen shot of an exemplary UI for searching an e-mail account according to one embodiment of the invention.

Referring now to FIG. 5, an exemplary screen shot illustrates an e-mail UI 502. The e-mail UI 502 is displayed on the screen in response to a determined scope corresponding to e-mail account. The e-mail UI 502 includes an input control 504 for defining one or more search terms that are of interest to the user. In this example, the default data source corresponds to an e-mail account associated with an e-mail application (e.g., Microsoft Outlook®). The user uses the mouse 108 or keyboard 106 to select a search control 506 included in the UI 502 to initiate the search of e-mail data included the e-mail account, and to display search results (e.g., e-mail messages, contacts) corresponding to the defined one or more search terms in the search results window 120.

Referring again to FIG. 2, although the STA 200 presents a UI to the user that corresponds to a default scope determined by the scope determining component 204, the user can override the default scope by using the keyboard 106 to define a preferred scope. For example, consider that the default scope is a web site (e.g., www.msn.com). The user uses the keyboard 106 to enter text into the address control that corresponds to a different scope such as a particular folder located on the client computer to limit the search for matching content to that particular folder rather than a particular server on the Internet. Alternatively, the user uses the keyboard 106 to enter text into the address control that corresponds to a location of a different server on the Internet (e.g., www.someotheraddress.com) to limit the search for matching content to the location of the different server on the Internet rather than the location of the default server.

Figure 6:
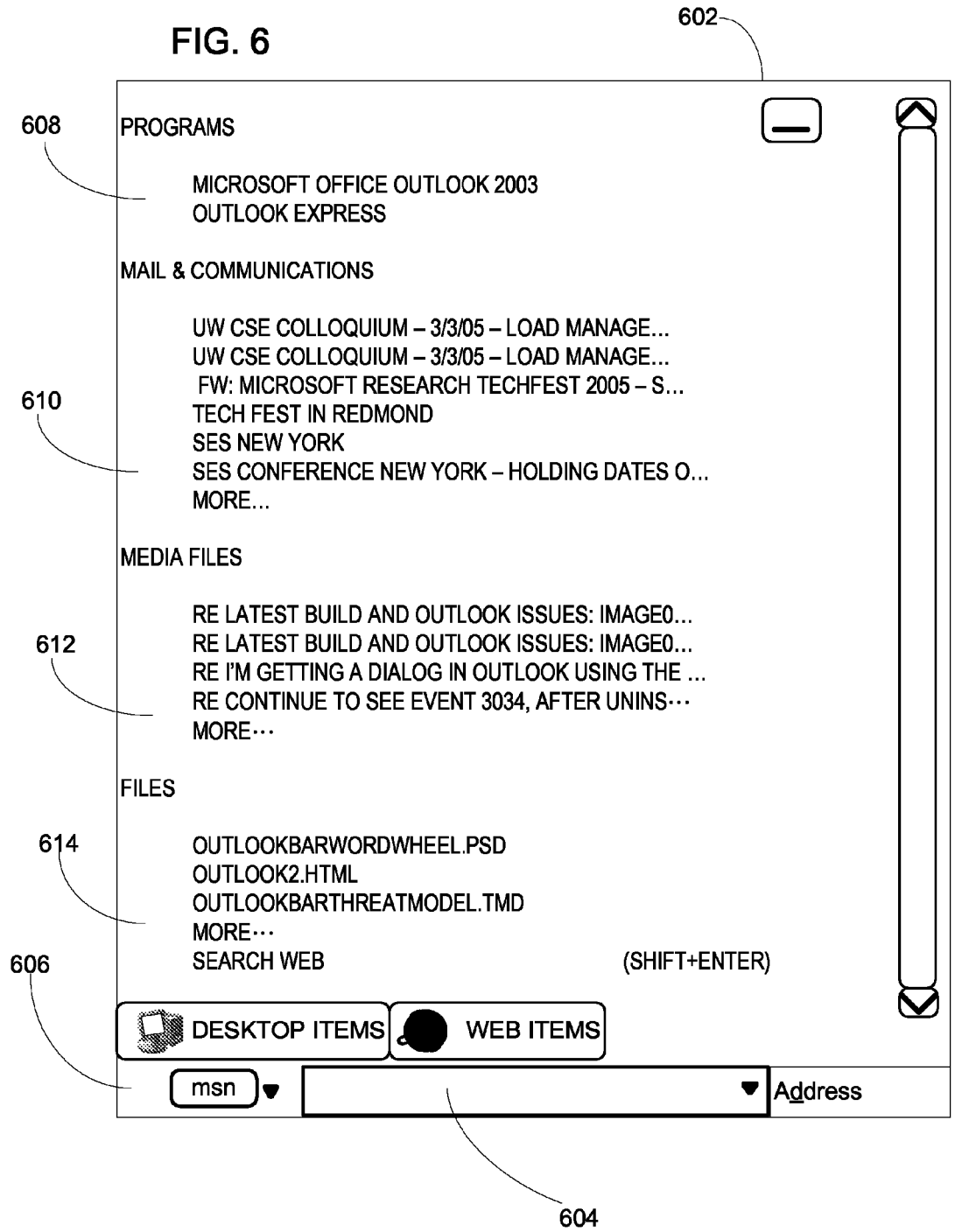
FIG. 6 is a screen shot of an exemplary UI for dynamically displaying search results according to one embodiment of the invention.

According to another embodiment of the invention, the STA 200 is responsive to user input to execute a partition component 208 to partition search results into various groupings as a function of file type for display to the user via a word wheel UI. Referring now to FIG. 6, a screen shot illustrates an exemplary word wheel UI 602 that appears as a pop-up window in response to user input within a query control 604 being displayed via a taskbar tool bar 606. According to an aspect of the present invention, the word wheel UI 602 enables the user to view search results according to a program file group 608, an e-mail file group 610 (e.g., e-mail messages), a media file group 612, and a document file group 610. As the user enters characters of a search term into the query control 604, the partitioning component 208 dynamically displays grouped results via the word wheel UI 602. For example, after the user types "o-u" into the query control, the word wheeling component displays a list of search results for each of various files types. The word wheel UI 602 allows the user to easily open or execute a particular file being displayed. For example, to launch a particular program file, the user clicks on the desired search result (e.g., Microsoft Office Outlook 2003) shown in the UI 602. In the alternative, the user navigates the search results with the keyboard's arrow keys and "enter" on the desired result item as a means for selecting the desired application to be launched.

Figure 7:
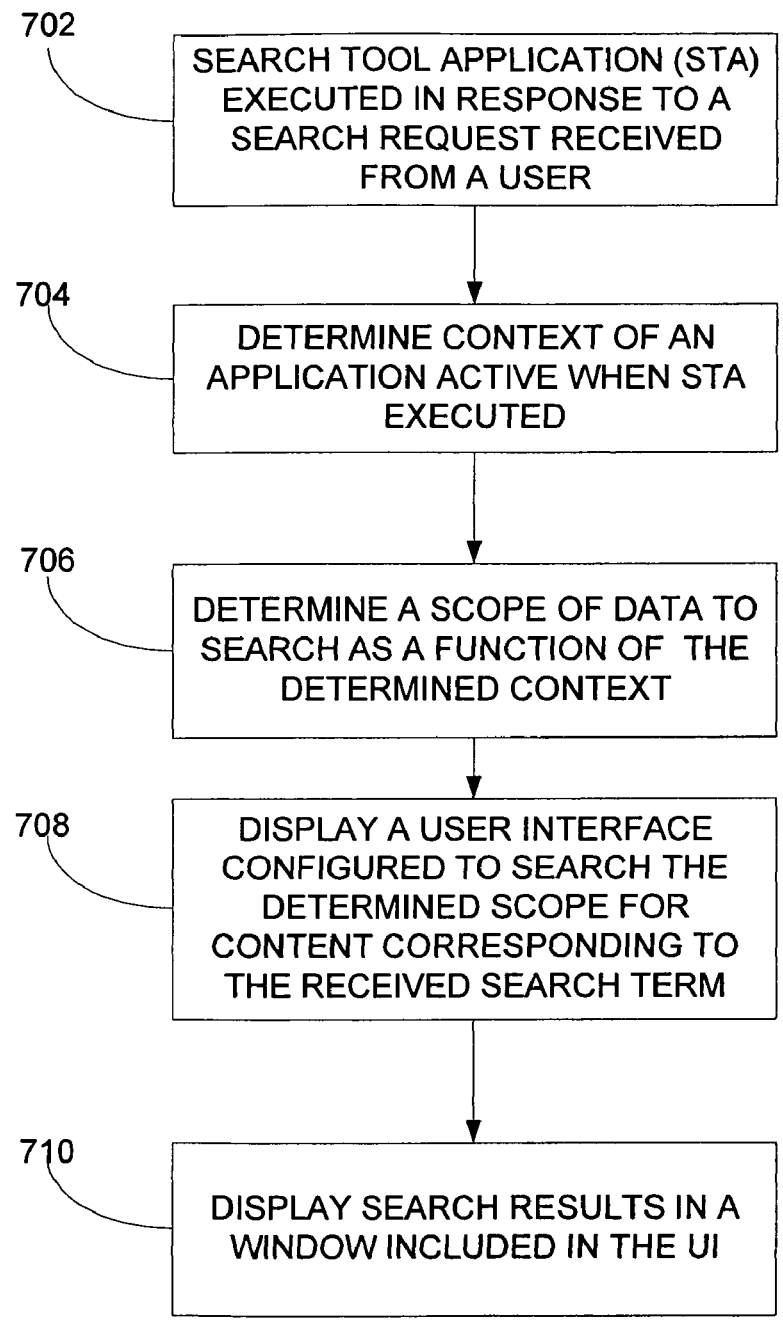
FIG. 7 a flow diagram illustrates a method for initiating a search on a computer executing one or more applications in accordance with one embodiment of the invention.

Referring now to FIG. 7, a flow diagram illustrates an exemplary method for initiating a search on a computer executing one or more applications in response to a search request from a user. At 702, a search tool application (STA) is executed on a client computer in response to a search request received from the user. The STA determines the context of a software application active when the STA is executed at 704. At 706, the STA determines a scope of data to search based on the determined context. The STA display a user interface configured to receive a search term from a user and to search the determined scope for content corresponding to the received search term at 708. At 710, the search results are displayed in a window included in the UI.

Figure 8:
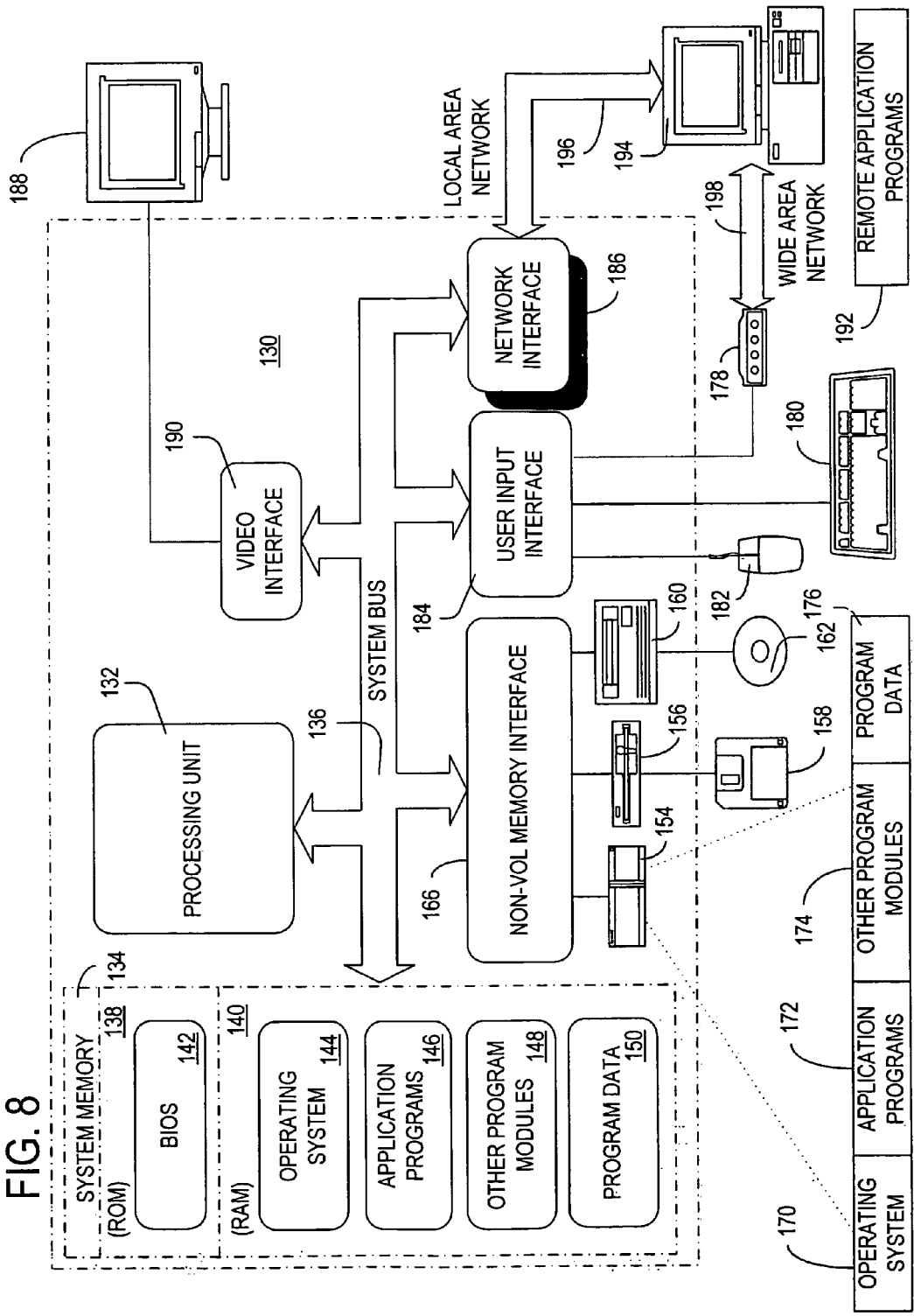
FIG. 8 is a block diagram illustrating an exemplary embodiment of a suitable computing system environment in which an embodiment of the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus The computer 130 typically has at least some form of computer readable media. Computer readable media, which include both volatile and nonvolatile media, removable and non-removable media, may be any available medium that may be accessed by computer 130. By way of example and not, limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one, or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

An interface in the context of software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation according to one embodiment of the invention, computer 130 initiates a search of a data source in response to a search request from a user. The computer 130 executes a search tool application 200 installed on the computer to display a customized UI 116 to a user. The customized UI 116 includes an input field (e.g., input control 304) for receiving a user-entered search term, and, as described above is customized for searching a default data source identified as a function of a currently active application. Computer 130 executes computer-executable instructions to search, based on the search term, the default database. The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

The invention claimed is:

1. A computerized method of customizing a search of a data source in response to a search request from a user, said data source being linked to a computer executing one or more applications, said method comprising:
    in response to receiving the search request, parsing data displayed on a display of the computer by an active application executed by the computer;
    detecting; from the parsed data, structured data indicative of a context of the active application for searching;
    retrieving a context hint stored in a memory, said context hint defining an anticipated context of the active application based on patterns included in the detected structured data;
    comparing the context hint to the detected structured data to determine the context of the active application for searching without receiving an explicit user designation of the context from the user;
    determining a default data source to search based on the determined context of the active application without receiving an explicit user designation of the default data source from the user;
    providing a customized user interface (UI) for receiving a user-entered search term based on the determined default data source, said customized UI including a search field for receiving the user-entered search term;
    displaying the provided customized UI;
    in response to receiving the user-entered search term, initiating a search of the determined default data source for content corresponding to the user-entered search term; and
    displaying search results to the user via a search results window, wherein the search results window is displayed after one or more characters of the search term are entered into the search field of the customized UI and updated thereafter for each additional character of the search term entered.

2. The method of claim 1, further comprising retrieving metadata from a header of the active application to identify pre-defined context data, said pre-defined context data defining of the context of the application without receiving an explicit user designation of the context from the user.

3. The method of claim 1, wherein determining a default data source to search includes searching a data table stored in a memory, said data table storing a list of different contexts and a corresponding default data source for each context in the list of different contexts.

4. The method of claim 1, wherein said displayed search results includes one or more files identified during the search of the default data source having content corresponding to the entered search term.

5. The method of claim 4, wherein said results include one or more files identified during the search of the determined source having content corresponding to the entered character.

6. The method of claim 4, wherein displaying comprises displaying the search results grouped according to a file type.

7. The method of claim 1, wherein displaying the provided customized UI includes displaying a local desktop UI when the determined default data source corresponds to a local desktop, a communication network UI when the determined default data source corresponds to a communication network, or an e-mail UI when the determined default data source corresponds to an e-mail account.

8. The method of claim 7, wherein the local desktop UI in response to the entered search term initiates a search of the local desktop computer for content corresponding to the entered search term, wherein the communication network UI in response to the entered search term initiates a search of the communication network for content corresponding to the entered search term, and wherein the e-mail UI in response to the entered search term initiates a search of the e-mail account for content corresponding to the entered search term.

9. A computer storage medium having computer-executable instructions for search of a data source in response to a search request from a user, said data source linked to a computer executing one or more applications, said computer-executable instructions comprising:
    in response to receiving the search request, parsing data displayed on a display of the computer by an active application executed by the computer;
    detecting, from the parsed data, structured data indicative of a context of the active application for searching;
    retrieving a context hint stored in a memory, said context hint defining an anticipated context of the active application based on patterns included in the detected structured data;
    comparing the context hint to the detected structured data to determine the context of the active application for searching without receiving an explicit user designation of the context from the user;
    determining a default data source to search as a function of the determined context without receiving an explicit user designation of the default data source from the user;
    providing a customized user interface (UI) for receiving a user-entered search term based on the determined default data source, said customized UI including a search field for receiving the user-entered search term;
    providing a customized search user interface (UI) configured for including a search field to receive a user-entered search term, said UI based on the determined default data source;

displaying the provided customized UI;

in response to receiving the user-entered search term, initiating a search of the determined default data source for content corresponding to the user-entered search term; and displaying search results to the user via a search results window, wherein said search results window is displayed after one or more characters of the search term are entered into the search field of the customized search UI and updated thereafter for each additional character of the search term entered.

10. The computer storage medium of claim 9 wherein the computer-executable instructions comprise displaying search results to the user via a search results window, wherein said results include one or more files identified during the search of the determined scope of data having content corresponding to the entered search term.

11. The computer storage medium of claim 10 wherein the one or more identified files include one or more of the following: program files; document files; and e-mail messages.

12. The computer storage medium of claim 9, wherein the UI displays a local desktop UI when the determined default data source corresponds to a local desktop, displays a communication network UI when the determined default data source corresponds to a communication network, or displays an e-mail UI when the determined default data source corresponds to an e-mail account.

13. The computer storage medium of claim 12, wherein the local desktop UI in response to the entered search term initiates a search of the local desktop computer for content corresponding to the entered search term, wherein the communication network UI in response to the entered search term initiates a search of the communication network for content corresponding to the entered search term, and wherein the e-mail UI in response to the entered search term initiates a search of the e-mail account for content corresponding to the entered search term.

14. A computer system for customizing a search in response to a search request from a user, comprising:

a processor;

a display coupled to the processor; and a computer storage medium coupled to the processor, the computer storage medium including computer-executable instructions that when executed by the processor cause a user interface (UI) to be rendered on the display in response to a search request received from a user, said UI representing one or more data fields in a data structure, said processor:

parsing information displayed on the display of the computer system by an active application executed by the processor and being used by the user to detect structured data indicative of a context of the active application for searching, determining the context of the active application for searching based on the detected structured data without receiving an explicit user designation of the context from the user, wherein said determining includes retrieving a context hint stored in a memory, said context hint defining an anticipated context of the active application based on patterns included in the detected structured data, and comparing the context hint to the detected structured data to determine the context of the active application for searching;

said UI comprising:

a search field of the UI for receiving user input to define a search term;

a default scope field defining a data source to be searched based on a determined context of an application without receiving an explicit user designation of a default data source from the user, said determined context of the application being based on an active application currently being used by the user and displayed on the computer, wherein said UI is responsive to the user input for initiating a search for content corresponding to the defined search term within the defined data source, said UI being customized to the determined context of the application; and a search results window for displaying search results to the user, wherein said results include one or more files identified during the search of the defined data source having content corresponding to the entered search term, wherein the search results window is displayed after one or more characters of the search term are entered into the search field of the customized UI and updated thereafter for each additional character of the search term entered.

15. The computer system of claim 14, wherein the search results window displays the search results grouped according to a file type.

* * * * *